US010682995B2

(12) United States Patent
Choi

(10) Patent No.: US 10,682,995 B2
(45) Date of Patent: Jun. 16, 2020

(54) CONTROL APPARATUS FOR ELECTRONIC PARKING BRAKE SYSTEM AND CONTROL METHOD THEREOF

(71) Applicant: MANDO CORPORATION, Gyeonggi-do (KR)

(72) Inventor: Ho-Jin Choi, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 75 days.

(21) Appl. No.: 15/284,461

(22) Filed: Oct. 3, 2016

(65) Prior Publication Data

US 2017/0096129 A1    Apr. 6, 2017

(30) Foreign Application Priority Data

Oct. 6, 2015    (KR) .......................... 10-2015-0140184

(51) Int. Cl.
*B60T 7/12*    (2006.01)
*B60T 8/24*    (2006.01)
(Continued)

(52) U.S. Cl.
CPC ................ *B60T 8/245* (2013.01); *B60T 7/12* (2013.01); *B60T 8/1755* (2013.01); *B60T 8/885* (2013.01);
(Continued)

(58) Field of Classification Search
CPC ........ B60T 8/245; B60T 8/1755; B60T 8/885; B60T 8/92; B60T 7/12; B60T 7/22;
(Continued)

(56) References Cited

U.S. PATENT DOCUMENTS 5,506,776 A * 4/1996 Fushimi ................ B62D 7/148
180/413
5,707,117 A * 1/1998 Hu ...................... B60G 17/0185
180/197

(Continued)

FOREIGN PATENT DOCUMENTS

CN    103847738    6/2014
CN    104024823    9/2014

OTHER PUBLICATIONS

Office Action dated Nov. 5, 2018 for Chinese Patent Application No. 201610880669.3 and its English machine translation by Global Dossier.

*Primary Examiner* — Richard A Goldman
(74) *Attorney, Agent, or Firm* — Ladas & Parry, LLP

(57) ABSTRACT

Disclosed herein are control apparatus for electronic parking brake system and control method thereof. The control apparatus for electronic parking brake system and control method includes an inputter configured to receive an abnormal operation signal from an electronic stability control (ESC) system when a vehicle stopping control function is abnormally performed in the ESC system; a determiner configured to determine whether an operation availability signal of an electronic parking brake (EPB) system is input from the EPB system, when the abnormal operation signal is input; and a controller configured to transmit a control command to the EPB system to activate the EPB system and have the EPB system perform a braking operation, when the operation availability signal of the EPB is input.

12 Claims, 13 Drawing Sheets

(51) Int. Cl.
*B60T 8/1755* (2006.01)
*B60T 8/88* (2006.01)
*B60T 8/92* (2006.01)
*B60T 7/22* (2006.01)

(52) U.S. Cl.
CPC . *B60T 7/22* (2013.01); *B60T 8/92* (2013.01); *B60T 2201/06* (2013.01); *B60T 2270/30* (2013.01); *B60T 2270/40* (2013.01); *B60T 2270/402* (2013.01)

(58) Field of Classification Search
CPC .. B60T 17/22; B60T 2201/06; B60T 2270/30; B60T 2270/40; B60T 2270/402; B60W 30/02; B60W 30/09
USPC ............... 701/29.2, 36, 41, 70, 82; 188/72.1
See application file for complete search history.

(56) References Cited

U.S. PATENT DOCUMENTS

| | | | | |
|---|---|---|---|---|
| 6,321,081 B1* | 11/2001 | Lee | ............. | H04W 24/00 |
| | | | | 340/7.32 |
| 6,795,761 B1* | 9/2004 | Lee | ............. | B60T 8/1755 |
| | | | | 180/6.2 |
| 6,802,401 B1* | 10/2004 | Bohm | ............. | B60T 7/042 |
| | | | | 188/158 |
| 7,092,809 B2* | 8/2006 | Endres | ............. | B60T 7/12 |
| | | | | 192/218 |
| 7,911,361 B2* | 3/2011 | Kumabe | ............. | G08G 1/096716 |
| | | | | 340/936 |
| 9,931,962 B2* | 4/2018 | Suzuki | ............. | B60L 15/20 |
| 2003/0033060 A1* | 2/2003 | Okoshi | ............. | B60K 6/365 |
| | | | | 701/22 |
| 2003/0087727 A1* | 5/2003 | Loibl | ............. | B60T 1/005 |
| | | | | 477/183 |
| 2004/0212247 A1* | 10/2004 | Endres | ............. | B60T 7/12 |
| | | | | 303/113.4 |
| 2006/0212192 A1* | 9/2006 | Bell | ............. | B60R 16/0234 |
| | | | | 701/33.4 |
| 2011/0071727 A1* | 3/2011 | Bechtler | ............. | G01D 3/08 |
| | | | | 701/29.2 |
| 2012/0303189 A1* | 11/2012 | Namuduri | ............. | B60W 20/00 |
| | | | | 701/22 |
| 2012/0319464 A1* | 12/2012 | Lloyd | ............. | B60T 1/10 |
| | | | | 303/3 |
| 2014/0015310 A1* | 1/2014 | Hanzawa | ............. | B60T 7/12 |
| | | | | 303/3 |
| 2014/0257660 A1* | 9/2014 | Kappes | ............. | B60T 7/22 |
| | | | | 701/70 |
| 2015/0170429 A1* | 6/2015 | Denny | ............. | B60W 30/09 |
| | | | | 701/36 |
| 2015/0175193 A1* | 6/2015 | Endo | ............. | B62D 5/0487 |
| | | | | 701/29.2 |
| 2016/0001781 A1* | 1/2016 | Fung | ............. | B60W 40/08 |
| | | | | 701/36 |
| 2017/0096129 A1* | 4/2017 | Choi | ............. | B60T 7/12 |
| 2018/0106364 A1* | 4/2018 | Wozniak | ............. | B60T 7/12 |

\* cited by examiner

CONTROL APPARATUS FOR ELECTRONIC PARKING BRAKE SYSTEM AND CONTROL METHOD THEREOF

CROSS-REFERENCE TO RELATED APPLICATION

This application claims the benefit of Korean Patent Application No. 2015-0140184, filed on Oct. 6, 2015 in the Korean Intellectual Property Office, the disclosure of which is incorporated herein by reference.

BACKGROUND

1. Field

Embodiments of the disclosure relate to a control apparatus for an electronic parking brake system and a method thereof.

2. Description of the Related Art

Generally, a conventional electronic stability control (ESC) system is provided to stabilize a vehicle.

However, conventional ESC systems have shown a limit with maintaining vehicle stability through braking operation when, due to an abnormal operation of the ESC system, a vehicle stopping control function is performed using an automatic stationary vehicle maintaining function such as an automatic vehicle hold (AVH) and hill start assist (HSA).

Due to a limit in stably controlling vehicle stopping with a conventional ESC system, there has been shown a limit to improving braking efficiency and also improving vehicle reliability.

Therefore, recently, research has been ongoing on a control apparatus using an improved electronic parking brake (EPB) system and a control method thereof which may improve vehicle reliability as well as braking efficiency.

In addition, recently, research has been ongoing on a control apparatus using an improved EPB system and a control method thereof which may guide a driver to be careful with driving while controlling vehicle stopping and also reduce time required for maintenance of the EPB system to prevent maintenance cost from increasing.

SUMMARY

Therefore, it is an aspect of the present disclosure to provide a control apparatus for an electronic parking brake system and a control method thereof capable of improving vehicle reliability as well as braking efficiency.

It is another aspect of the present disclosure to provide a control apparatus for an EPB system and a control method thereof capable of guiding a driver to be careful with driving while controlling vehicle stopping.

It is still another aspect of the present disclosure to provide a control apparatus for an EPB system and a control method thereof capable of reducing time required for maintenance of a EPB system to prevent maintenance cost from increasing.

According to an aspect of the present invention, there is provided a control apparatus for an electronic parking brake (EPB) system, comprising: an inputter configured to receive an abnormal operation signal from an electronic stability control (ESC) system when a vehicle stopping control function is abnormally performed in the ESC system; a determiner configured to determine whether an operation availability signal of an electronic parking brake (EPB) system is input from the EPB system, when the abnormal operation signal is input; and a controller configured to transmit a control command to the EPB system to activate the EPB system and have the EPB system perform a braking operation, when the operation availability signal of the EPB is input.

At this time, the vehicle stopping control function may comprise at least one of a AVH (Automatic Vehicle Hold), and a HSA (Hill Start Assist).

Also, the control apparatus for an electronic parking brake (EPB) system may further comprise; a first indicator configured to indicate that a current operation state of the ESC system is an abnormal state when the abnormal operation signal is input.

Also, the control apparatus for an electronic parking brake (EPB) system may further comprise; a second indicator configured to indicate that a current operation state of the EPB system is an abnormal state when an operation availability signal of the EPB system is not input.

Also, the control apparatus for an electronic parking brake (EPB) system may further comprise; a third indicator configured to indicate a braking operation is currently being performed by the EPB system, when the control command is transmitted to the EPB system.

According to another aspect of the present invention, there is provided a control apparatus for an electronic parking brake (EPB) system, comprising: an inputter configured to receive a first current drive information output from an electronic stability control (ESC) system when the ESC system performs a vehicle stopping control function; a determiner configured to determine whether a second current drive information output from EPB system is preset second reference drive information, unless the first current drive information is preset first reference drive information; and a controller which transmits a control command to the EPB system to activate the EPB system and have the EPB system perform a braking operation, when the second current drive information is the second reference drive information.

At this time, the vehicle stopping control function may comprise at least one of a AVH (Automatic Vehicle Hold), and a HSA (Hill Start Assist).

Also, the control apparatus for an electronic parking brake (EPB) system may comprise; the determiner determines whether a current operating voltage value of the ESC system serving as current fault estimation information corresponding to the first current drive information deviates from a reference operating voltage value range of the ESC system serving as reference fault estimation information corresponding to the first reference drive information.

Also, the control apparatus for an electronic parking brake (EPB) system may comprise; the determiner determines whether the current operating voltage value of the ESC system serving as current overheating estimation information corresponding to the first current drive information deviates from the reference operating voltage value range of the ESC system serving as reference overheating estimation information corresponding to the first reference drive information.

Also, the control apparatus for an electronic parking brake (EPB) system may further comprise; a first indicator configured to indicate that a current operation state of the ESC system is an abnormal state unless the first current drive information is the first reference drive information.

Also, the control apparatus for an electronic parking brake (EPB) system may comprise; the determiner determines whether a current operating voltage value of the EPB system serving as current operation availability estimation information corresponding to the second current drive information deviates from a reference operating voltage value range of the EPB system serving as reference operation availability estimation information corresponding to the second reference drive information.

Also, the control apparatus for an electronic parking brake (EPB) system may further comprise; a second indicator configured to indicate a current operation state of the EPB system is an abnormal state unless the second current drive information is the second reference drive information.

Also, the control apparatus for an electronic parking brake (EPB) system may further comprise; a third indicator configured to indicate a braking operation is currently being performed by the EPB system, when the control command is transmitted to the EPB system.

According to an aspect of the present invention, there is provided a control method for an electronic parking brake (EPB) system, comprising: an input operation by which an abnormal operation signal is input from an electronic stability control (ESC) system when vehicle stopping control function is abnormally performed in the ESC system; a determination operation by which whether an operation availability signal of the EPB system is input from the EPB system is determined when the abnormal operation signal is input; and a braking operation by which a control command is transmitted to the EPB system to activate the EPB system and have the EPB system perform a braking operation, when the operation availability signal of the EPB system is provided.

According to another aspect of the present invention, there is provided a control method for an electronic parking brake (EPB) system, comprising: an input operation by which first current drive information output from an electronic stability control (ESC) system is input when the ESC system performs a vehicle stopping control function; a determination operation by which whether second current drive information output from the EPB system is preset second reference drive information is determined, unless first current drive information is preset first reference drive information; and a braking operation by which a control command is transmitted to the EPB system to activate the EPB system and have the EPB system perform a braking operation, when the second current drive information is the second reference drive information.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
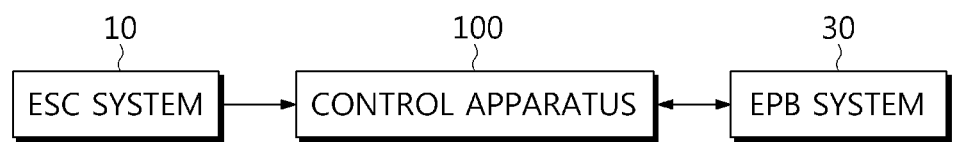
FIG. 1 is a block diagram illustrating a control apparatus for an electronic parking brake (EPB) system according to a first embodiment of the present disclosure.

Hereinafter, embodiments of the present disclosure will be described in detail with reference to the accompanying drawings. These embodiments below are provided to fully convey the concepts of the present disclosure to those skilled in the art. Accordingly, the present disclosure may be embodied in a different form and is not to be construed as being limited to the embodiments set forth herein. Further, in the drawings, for the sake of clarity of the present disclosure, an illustration may have omitted portions unrelated to the explanation, and sizes of elements may be somewhat exaggerated for convenience of understanding.

Figure 2:
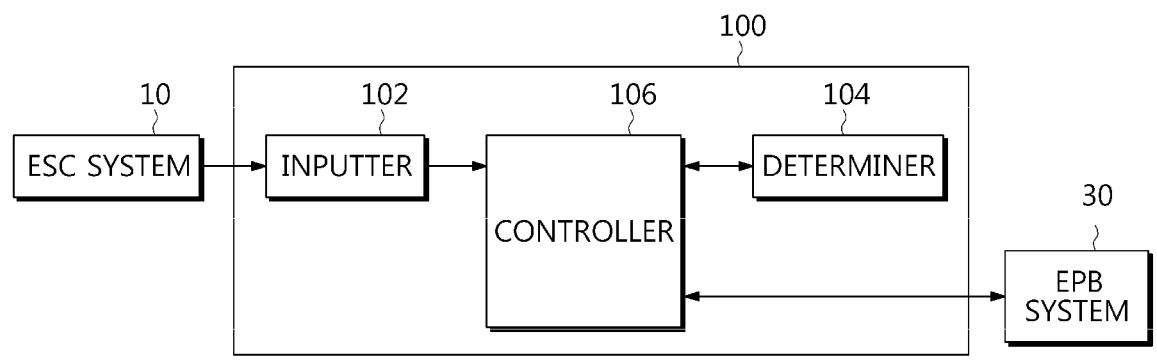
FIG. 2 is a block diagram illustrating an example of the control apparatus shown in FIG. 1.

FIG. 1 is a block diagram illustrating a control apparatus for an electronic parking brake (EPB) system according to a first embodiment of the present disclosure, and FIG. 2 is a block diagram illustrating an example of the control apparatus shown in FIG. 1.

Referring to FIGS. 1 and 2, a control apparatus 100 for the EPB system 30 according to the first embodiment of the present disclosure includes an inputter 102, a determiner 104, and a controller 106.

The inputter 102 receives an abnormal operation signal from an electronic stability control (ESC) system 10 when a vehicle stopping control function is performed in the ESC system 10 due to an abnormal operation.

Here, the vehicle stopping control function may be automatic stationary vehicle maintaining functions such as an automatic vehicle hold (AVH) and hill start assist (HSA).

When the determiner 104 receives the abnormal operation signal from the inputter 102, the determiner 104 determines whether an operation availability signal of the EPB system 30 is input from the EPB system 30.

When the operation availability signal of the EPB system 30 is input from the EPB system 30, the controller 106 transmits a control command to the EPB system 30 to activate the EPB system 30 and have the EPB system 30 perform the braking operation.

Here, although not illustrated in the drawings, the inputter 102, the determiner 104, and the controller 106 may be provided in a typical electronic control unit (ECU) (not shown) serving as a main computer for a vehicle, which controls and determines an overall operation and receives an abnormal operation signal.

In addition, although not illustrated in the drawings, the inputter 102, the determiner 104, and the controller 106 may be provided in a typical micro controller (MCU) (not shown) having a processor, a memory, and input/output devices in a single chip for controlling and determining an overall operation and receiving an abnormal operation signal.

In addition, implementation of the inputter 102, the determiner 104, and the controller 106 is not limited to the above-described methods, and any implementation method of control, making determinations, and input capable of controlling and determining an overall operation of a vehicle and receiving an abnormal operation signal may be used.

Here, the inputter 102, the determiner 104, and the controller 106 may be provided to be integrated in an ECU or MCU or may be separately provided in the ECU or MCU.

In addition, the inputter 102 receives first current drive information output from the ESC system 10 when the ESC 10 system performs a vehicle stopping control function.

Here, the vehicle stopping control function may generally be the automatic stationary vehicle maintaining function such as the AVH and HSA.

Unless the first current drive information is preset first reference drive information, the determiner 104, by a control of the controller 106, determines whether second current drive information output from the EPB system 30 is preset second reference drive information.

Here, the determiner 104 determines whether current controller area network (CAN) communication information is preset reference CAN communication information, unless the first current drive information is the preset first reference drive information and may determine, by control of the controller 106, whether the second current drive information output from the EPB system 30 is the preset second reference drive information, unless the current CAN communication information is the reference CAN communication information.

For example, the determiner 104 may determine, by a control of the controller 106, whether a current operating voltage value of the ESC system 10 serving as current fault estimation information corresponding to the first current drive information deviates from a reference operating voltage value range of the ESC system 10 serving as reference fault estimation information corresponding to the first reference drive information.

As another example, the determiner 104 may determine, by a control of the controller 106, whether the current operating voltage value of the ESC system 10 serving as current overheating estimation information corresponding to the first current drive information deviates from the reference operating voltage value range of the ESC system 10 serving as reference overheating estimation information corresponding to the first reference drive information.

As still another example, the determiner 104 may determine, by a control of the controller 106, whether the current operating voltage value of the EPB system 30 serving as current operation availability estimation information corresponding to the second current drive information deviates from the reference operating voltage value range of the EPB system 30 serving as reference operation availability estimation information corresponding to the second reference drive information.

The controller 106 transmits a control command to the EPB system 30 to activate the EPB system 30 and have the EPB system 30 perform the braking operation, when the determiner 104 determines the second current drive information is the second reference drive information.

Here, although not illustrated in the drawings, the inputter 102, the determiner 104, and the controller 106 may be provided in a typical ECU (not shown) serving as a main computer for a vehicle which controls and determines an overall operation and receives the first current drive information.

In addition, although not illustrated in the drawings, the inputter 102, the determiner 104, and the controller 106 may be provided in a typical MCU (not shown) having a processor, a memory, and input/output devices in a single chip for controlling and determining an overall operation and receiving the first current drive information.

In addition, implementation of the inputter 102, the determiner 104, and the controller 106 is not limited to the above-described methods, and any implementation method of control, making determinations, and input capable of controlling and determining an overall operation of a vehicle and receiving the first current drive information may be used.

Here, the inputter 102, the determiner 104, and the controller 106 may be provided to be integrated in an ECU or MCU or may be separately provided in the ECU or MCU.

A control method for controlling an electronic parking brake (EPB) system 30 using a control apparatus 100 for the EPB system 30 according to the first embodiment of the present disclosure will be described with reference to FIGS. 3 and 4 below.

Figure 3:
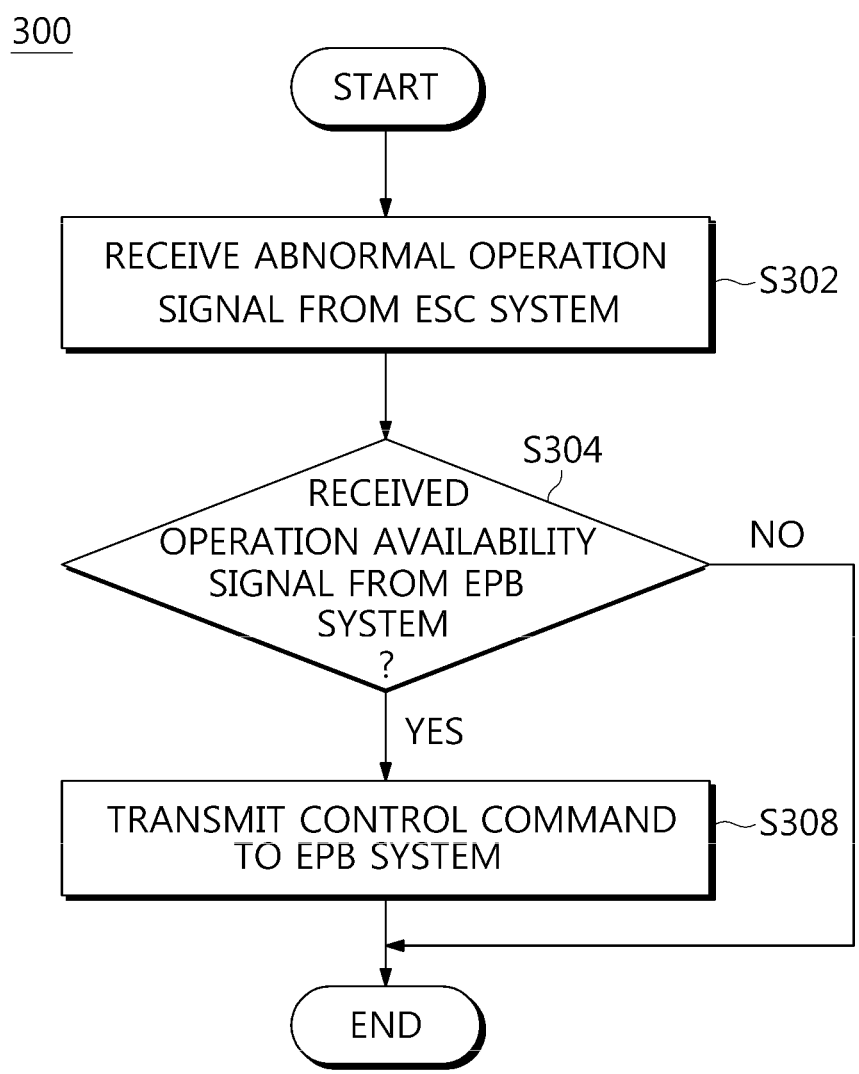
FIG. 3 is a flowchart illustrating an example of a method for controlling the EPB system using the control apparatus for the EPB system according to the first embodiment of the present disclosure.
Figure 4:
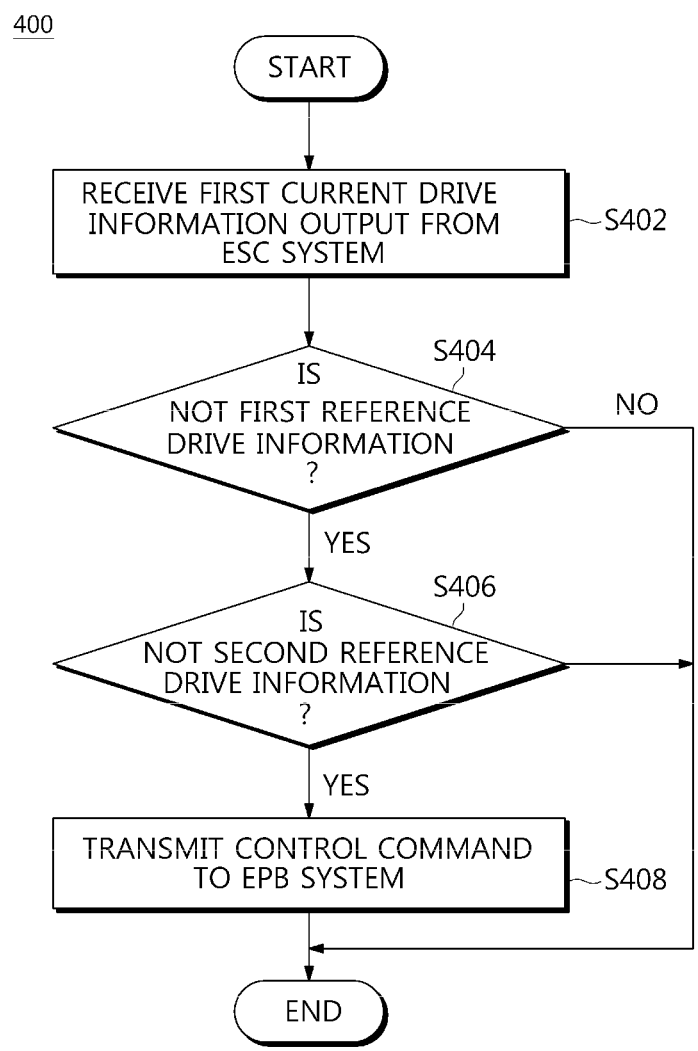
FIG. 4 is a flowchart illustrating another example of a method for controlling the EPB system using the control apparatus for the EPB system according to the first embodiment of the present disclosure.

FIG. 3 is a flowchart illustrating an example of a method for controlling the EPB system using the control apparatus for the EPB system according to the first embodiment of the present disclosure, and FIG. 4 is a flowchart illustrating another example of a method for controlling the EPB system using the control apparatus for the EPB system according to the first embodiment of the present disclosure.

Referring to FIGS. 3 and 4, control methods 300 and 400 for controlling the EPB system 30 (see FIGS. 1 and 2) using the control apparatus 100 (see FIGS. 1 and 2) for the EPB system 30 (see FIGS. 1 and 2) according to the first embodiment of the present disclosure include input operations S302 and S402, determination operations S304, S404, and S406, and braking operations S308 and S408.

First, as illustrated in FIG. 3, in input operation S302, the inputter 102 (see FIG. 2) receives an abnormal operation signal from the ESC system 10 (see FIG. 2) when a vehicle stopping control function is abnormally performed in the ESC system 10 (see FIG. 2).

Next, in determination operation S304, the determiner 104 (see FIG. 2) determines, by a control of the controller 106 (see FIG. 2), whether an operation availability signal of the EPB system 30 (see FIG. 2) is input from the EPB system 30 (see FIG. 2) when the abnormal operation signal is input from the inputter 102 (see FIG. 2).

Next, in braking operation S308, the controller 106 (see FIG. 2) transmits a control command to the EPB system 30 (see FIG. 2) to activate the EPB system 30 and have the EPB system 30 (see FIG. 2) perform the braking operation, when the operation availability signal of the EPB system 30 (see FIG. 2) is input from the EPB system 30.

In addition, as illustrated in FIG. 4, in input operation S402, the inputter 102 (see FIG. 2) receives first current drive information output from the ESC system 10 (see FIG. 2) when the ESC system 10 (see FIG. 2) performs a vehicle stopping control function.

Next, in determination operations S404 and S406, when the determiner 104 (see FIG. 2) determines the first current drive information is not preset first reference drive information (S404), the determiner 104 (see FIG. 2) determines, by a control of the controller 106 (see FIG. 2), whether second current drive information output from the EPB system 30 (see FIG. 2) is preset second reference drive information (S406).

For example, in determination operation S404, the determiner 104 (see FIG. 2) may determine, by a control of the controller 106 (see FIG. 2), whether a current operating voltage value of the ESC system 10 (see FIG. 2) serving as current fault estimation information corresponding to the first current drive information deviates from a reference operating voltage value range of the ESC system 10 (see FIG. 2) serving as reference fault estimation information corresponding to the first reference drive information.

As another example, in determination operation S404, the determiner 104 (see FIG. 2) may determine, by a control of the controller 106 (see FIG. 2), whether the current operating voltage value of the ESC system 10 (see FIG. 2) serving as current overheating estimation information corresponding to the first reference drive information deviates from the reference operating voltage value range of the ESC system 10 (see FIG. 2) serving as reference overheating estimation information corresponding to the first reference drive information.

As still another example, in determination operation S404, the determiner 104 (see FIG. 2) may determine, by a control of the controller 106 (see FIG. 2), whether the current operating voltage value of the EPB system 30 (see FIG. 2) serving as current operation availability estimation information corresponding to the second current drive information deviates from the reference operating voltage value range of the EPB system 30 (see FIG. 2) serving as reference operation availability estimation information corresponding to the second reference drive information.

Next, in braking operation S408, the controller 106 (see FIG. 2) transmits a control command to the EPB system 30 (see FIG. 2) to activate the EPB system 30 and have the EPB system 30 (see FIG. 2) perform the braking operation, when the determiner 104 (see FIG. 2) determines the second current drive information is the second reference drive information S406.

The control apparatus 100 and the control methods 300 and 400 for the EPB system 30 according to the first embodiment of the present disclosure include the inputter 102, the determiner 104, the controller 106, and perform input operations S302 and S402, determination operations S304, S404, and S406, and braking operations S308 and S408.

Therefore, the control apparatus 100 and the control methods 300 and 400 for the EPB system 30 according to the first embodiment of the present disclosure may allow the EPB system 30 to perform a braking operation when the vehicle stopping control function is abnormally performed in the ESC system 10.

Accordingly, the control apparatus 100 and the control methods 300 and 400 for the EPB system 30 according to the first embodiment of the present disclosure may stably control vehicle stopping and thus may improve vehicle reliability as well as braking efficiency.

Figure 5:
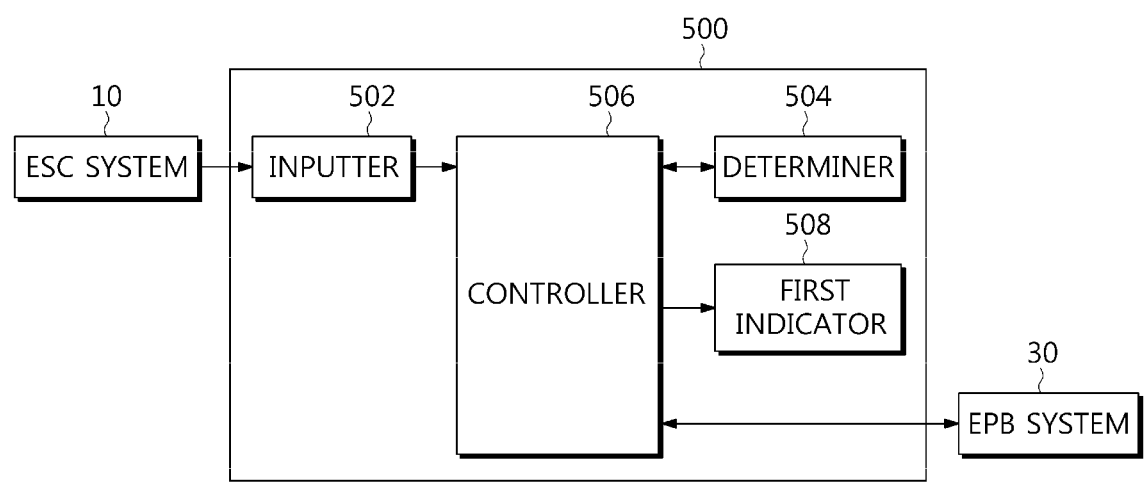
FIG. 5 is a block diagram illustrating an example of a control apparatus for an EPB system according to a second embodiment of the present disclosure.

FIG. 5 is a block diagram illustrating an example of a control apparatus for an EPB system according to a second embodiment of the present disclosure.

Referring to FIG. 5, a control apparatus 500 for an EPB system 30 according to the second embodiment of the present disclosure includes an inputter 502, a determiner 504, and a controller 506 which are the same as those in the control apparatus 100 (see FIG. 2) for the EPB system 30 (see FIG. 2) according to the first embodiment.

Since functions of the inputter 502, the determiner 504, and the controller 506, and systematic connection relations therebetween in the control apparatus 500 for the EPB system 30 according to the second embodiment of the present disclosure are the same as the functions of the inputter 102 (see FIG. 2), the determiner 104 (see FIG. 2), and the controller 106 (see FIG. 2), and the systematic connection relations therebetween in the control apparatus 100 (see FIG. 2) for the EPB system 30 (see FIG. 2) according to the first embodiment of the present disclosure, additional descriptions on each of the components will be omitted.

Here, the control apparatus 500 for the EPB system 30 according to the second embodiment of the present disclosure further includes a first indicator 508.

That is, the first indicator 508, by a control of the controller 806, indicates that a current operating state of an ESC system 10 is an abnormal state when an abnormal operation signal is input from the inputter 802.

In addition, the first indicator 508, by a control of the controller 506, indicates that a current operating state of the ESC system 10 is an abnormal state when the determiner 504 determines that a first current drive information is not a first reference drive information.

Here, although not illustrated in the drawings, the first indicator 508 includes at least one of an alarm (not shown), a speaker (not shown), and a light emitting member (not shown) which are provided for a driver to obtain vehicle information or realize a vehicle state and may make a driver recognized that a current operating state of the ESC system 10 is an abnormal state by at least one operation of an alarming operation of the alarm (not shown), a voice operation of the speaker (not shown), and a light emitting operation of the light emitting member (not shown).

In addition, although not illustrated in the drawings, the first indicator 508 includes at least one of a human machine interface (HMI) module (not shown) and a head-up display (HUD) module (not shown), which are installed to interface a driver and a machine, for the driver to understand vehicle information or vehicle status and may indicate that a current operating state of the ESC system is an abnormal state by at least one operation of a HMI message display of the HMI module (not shown) and a HUD message display of the HUD module (not shown).

A control method for controlling the EPB system 30 using the control apparatus 500 of the EPB system 30 according to the second embodiment of the present disclosure will be described with reference to FIGS. 6 to 7 below.

Figure 6:
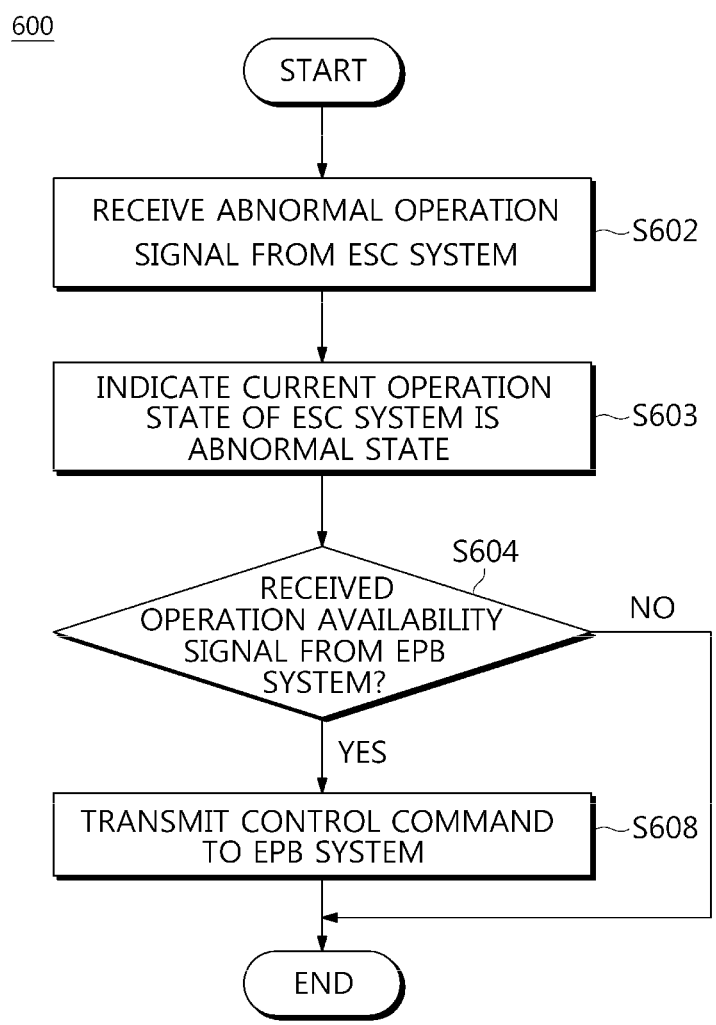
FIG. 6 is a flowchart illustrating an example of the method for controlling the EPB system using the control apparatus for the EPB system according to the second embodiment of the present disclosure.
Figure 7:
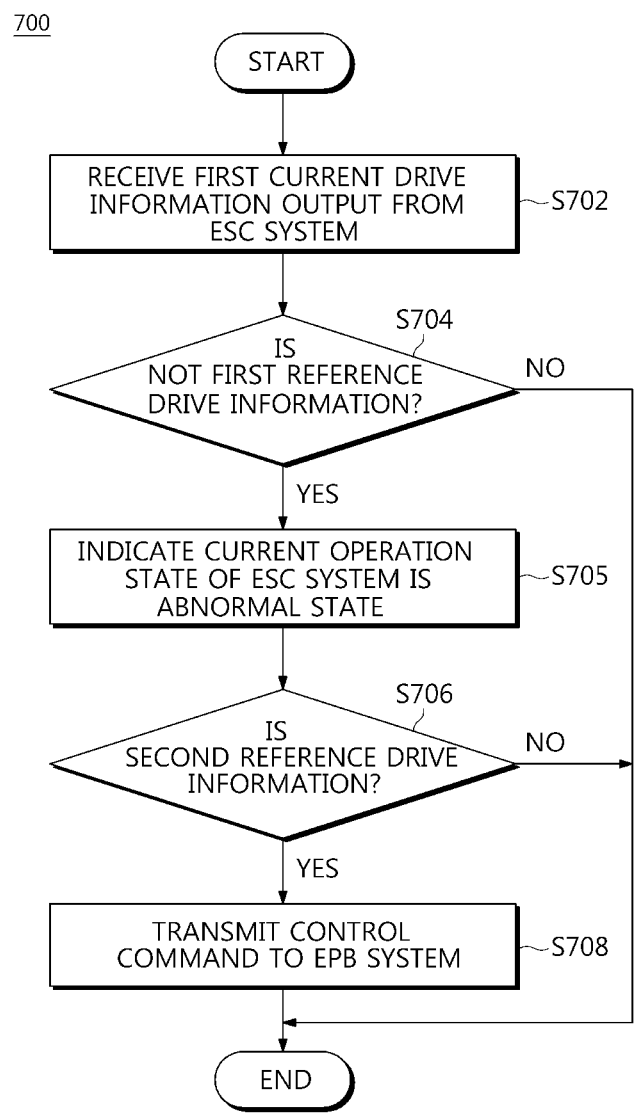
FIG. 7 is a flowchart illustrating another example of the method for controlling the EPB system using the control apparatus for the EPB system according to the second embodiment of the present disclosure.

FIG. 6 is a flowchart illustrating an example of the method for controlling the EPB system using the control apparatus for the EPB system according to the second embodiment of the present disclosure, and FIG. 7 is a flowchart illustrating another example of the method for controlling the EPB system using the control apparatus for the EPB system according to the second embodiment of the present disclosure.

Referring to FIGS. 6 and 7, control methods 600 and 700 for controlling the EPB system 30 (see FIG. 5) using the control apparatus 500 (see FIG. 5) for the EPB system 30 (see FIG. 5) according to the second embodiment of the present disclosure include input operations S602 and S702, determination operations S604, S704, and S706, and braking operations S608 and S708 which are the same as those in the control methods S300 (see FIG. 3) and S400 (see FIG. 4) for the EPB system 30 (see FIG. 2) using the control apparatus 100 (see FIG. 2) for the EPB system 30 (see FIG. 2) according to the first embodiment.

Since functions of input operations S602 and S702, determination operations S604, S704, and S706, and braking operations S608 and S708 and systematic connection relations therebetween in the control methods 600 and 700 for the EPB system 30 (see FIG. 5) according to the second embodiment of the present disclosure are the same as the functions of input operations S302 (see FIG. 3) and S402 (see FIG. 4), determination operations S304 (see FIG. 3) and S304, S404, and S406 (see FIG. 4), and determination operations S304 (see FIG. 3), S404 and S406 (see FIG. 4), and braking operations S308 (see FIG. 3) and S408 (see FIG. 4) and the systematic connection relations therebetween in the control methods 300 (see FIG. 3) and 400 (see FIG. 4) for the EPB system 30 (see FIG. 2) according to the first embodiment of the present disclosure, additional descriptions on each of the components will be omitted.

Here, the control methods 600 and 700 for the EPB system 30 (see FIG. 5) according to the second embodiment of the present disclosure further include first indicating operations S603 and S705.

For example, as illustrated in FIG. 6, in first indicating operation S603, the first indicator 508 (see FIG. 8), by the control of the controller 506 (see FIG. 5), indicates that a current operating state of the ESC system 10 (see FIG. 5) is an abnormal state when an abnormal operation signal is input from the inputter 502 (see FIG. 5).

As another example, as illustrated in FIG. 7, in first indicating operation S705, the first indicator 508 (see FIG. 5) indicates that a current operating state of the ESC system 10 (see FIG. 5) is an abnormal state when the determiner 504 (see FIG. 5) determines the first current drive information is not the first reference drive information.

The control apparatus 500 and the control methods 600 and 700 for the EPB system 30 according to the second embodiment of the present disclosure include the inputter 502, the determiner 504, controller 506 and the first indicator 508 and perform input operations S602 and S702, first indicating operations S603 and S705, determination operations S604, S704, and S706, and braking operations 608 and S708.

Therefore, the control apparatus 500 and the control methods 600 and 700 for the EPB system 30 according to the second embodiment of the present disclosure allow the EPB system 30 to perform a braking operation when a vehicle stopping control function is abnormally performed in the ESC system 10 (see FIG. 2).

Accordingly, the control apparatus 500 and the control methods 600 and 700 for the EPB system 30 according to the second embodiment of the present disclosure may stably control vehicle stopping and thus may improve vehicle reliability as well as braking efficiency.

In addition, since the control apparatus 500 and the control methods 600 and 700 for the EPB system 30 according to the second embodiment of the present disclosure may indicate that a current operating state of the ESC system 10 is an abnormal state, a driver may recognize that a current operating state of the ESC system 10 is an abnormal state and thereby guiding a driver to be careful with driving while controlling vehicle stopping.

Figure 8:
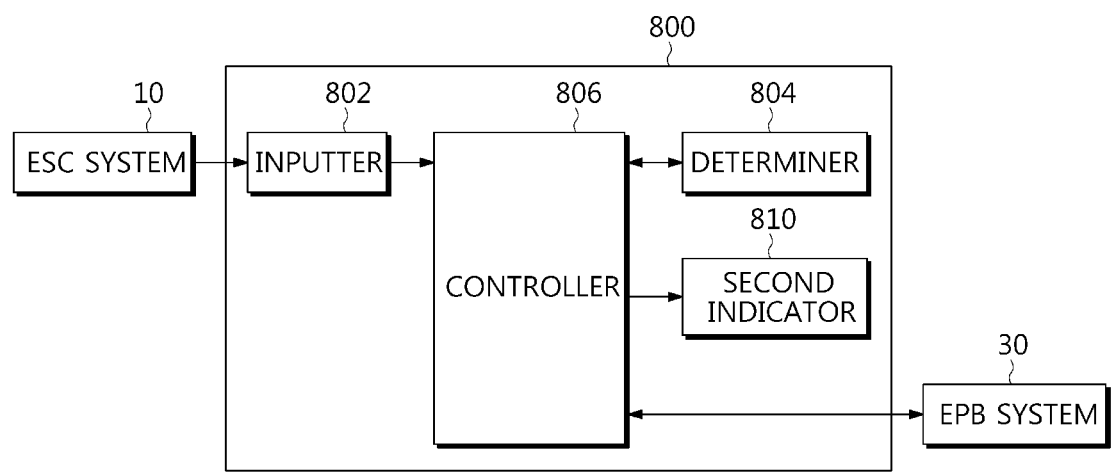
FIG. 8 is a block diagram illustrating an example of a control apparatus for an EPB system according to a third embodiment of the present disclosure.

FIG. 8 is a block diagram illustrating an example of a control apparatus for an EPB system according to a third embodiment of the present disclosure.

Referring to FIG. 8, a control apparatus 800 for the EPB system 30 according to the third embodiment of the present disclosure includes an inputter 802, a determiner 804, and a controller 806 which are the same as those in the control apparatus 100 (see FIG. 2) for the EPB system 30 (see FIG. 2) according to the first embodiment.

Since functions of the inputter 802, the determiner 804, and the controller 806, and systematic connection relations therebetween in the control apparatus 800 for the EPB system 30 according to the third embodiment of the present disclosure are the same as the functions of the inputter 102 (see FIG. 2), the determiner 104 (see FIG. 2), and the controller 106 (see FIG. 2), and the systematic connection relations therebetween in the control apparatus 100 (see FIG. 2) for the EPB system 30 (see FIG. 2) according to the first embodiment of the present disclosure, additional descriptions on each of the components will be omitted.

Here, the control apparatus 800 for the EPB system 30 according to the third embodiment of the present disclosure further includes a second indicator 810.

That is, the second indicator 810, by a control of the controller 806, indicates that a current operating state of the EPB system 30 is an abnormal state unless an operating availability signal of the EPB system 30 is not input from the inputter 802.

In addition, the second indicator 810, by a control of the controller 806, indicates that a current operating state of the EPB system 30 is an abnormal state when the determiner 804 determines second current drive information is not second reference drive information.

Here, although not illustrated in the drawings, the second indicator 810 includes at least one of an alarm (not shown), a speaker (not shown), and a light emitting member (not shown) which are provided for a driver to obtain vehicle information or realize a vehicle state and may indicate that a current operating state of the EPB system 30 is an abnormal state by at least one operation of an alarming operation of the alarm (not shown), a voice operation of the speaker (not shown), and a light emitting operation of the light emitting member (not shown).

In addition, although not illustrated in the drawings, the second indicator 810 includes at least one of a HMI module (not shown) and a HUD module (not shown), which are installed to interface a driver and a machine, for the driver to understand vehicle information or a vehicle state and may indicate that a current operating state of the EPB system 30 is an abnormal state by at least one operation of a HMI message display of the HMI module and a HUD message display of the HUD module.

A control method for controlling the EPB system 30 using the control apparatus 800 for the EPB system 30 according to the third embodiment of the present disclosure will be described with reference to FIGS. 9 to 10 below.

Figure 9:
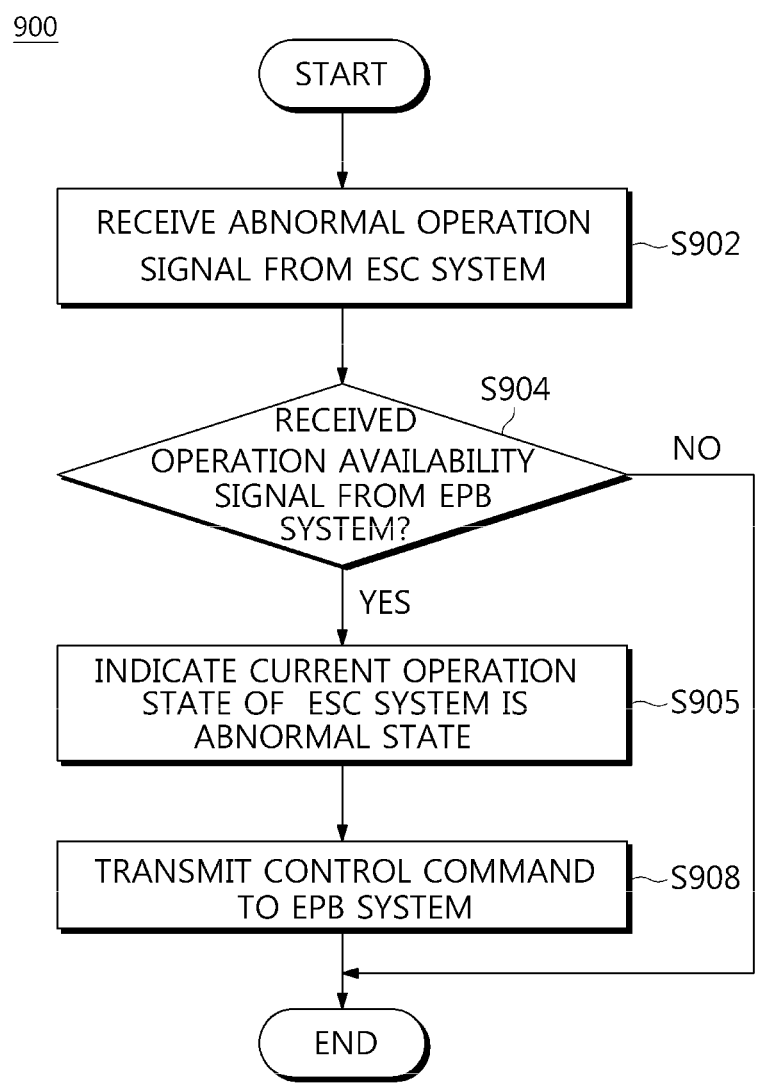
FIG. 9 is a flowchart illustrating an example of the method for controlling the EPB system using the control apparatus for the EPB system according to the third embodiment of the present disclosure.
Figure 10:
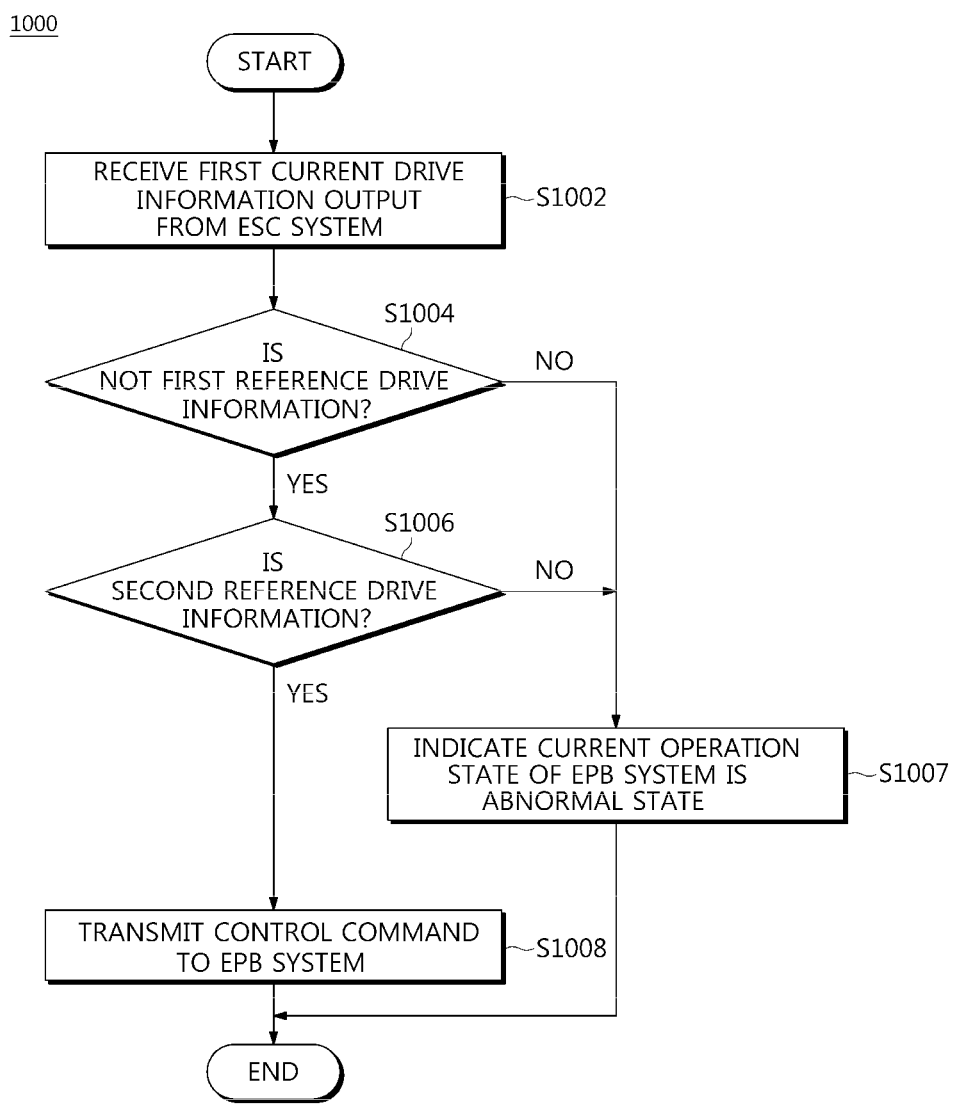
FIG. 10 is a flowchart illustrating another example of the method for controlling the EPB system using the control apparatus for the EPB system according to the third embodiment of the present disclosure.

FIG. 9 is a flowchart illustrating an example of the method for controlling the EPB system using the control apparatus for the EPB system according to the third embodiment of the present disclosure, and FIG. 10 is a flowchart illustrating another example of the method for controlling the EPB system using the control apparatus for the EPB system according to the third embodiment of the present disclosure.

Referring to FIGS. 9 and 10, control methods 900 and 1000 for controlling the EPB system 30 (see FIG. 8) using the control apparatus 800 for FIG. 8 of the EPB system 30 (see FIG. 8) according to the third embodiment of the present disclosure include input operations S902 and S1002, determination operations S904, S1004, and S1006, and braking operations S908 and S1008 which are the same as those in the control methods S300 (see FIG. 3) and S400 (see FIG. 4) for the EPB system 30 (see FIG. 2) using the control apparatus 100 (see FIG. 2) for the EPB system 30 (see FIG. 2) according to the first embodiment.

Since functions of input operations S902 and S1002, determination operations S904, S1004, and S1006, and braking operations S908 and S1008 and systematic connection relations therebetween in the control methods 900 and 1000 for the EPB system 30 (see FIG. 8) according to the third embodiment of the present disclosure are the same as the functions of input operations S302 (see FIG. 3) and S402 (see FIG. 4), determination operations S304 (see FIG. 3) and S404 and S406 (see FIG. 4), determination operations S304 (see FIG. 3) and S404 and S406 (see FIG. 4), and braking operations S308 (see FIG. 3) and S400 (see FIG. 4) and the systematic connection relations therebetween in the control methods 300 (see FIG. 3) and 400 (see FIG. 4) for the EPB system 30 (see FIG. 2) according to the first embodiment of the present disclosure, additional descriptions on each of the components will be omitted.

Here, the control methods 900 and 1000 for the EPB system 30 (see FIG. 8) according to the third embodiment of the present disclosure further includes second indicating operations S905 and S1007.

For example, as illustrated in FIG. 9, in second indicating operation S905, the second indicator 810 (see FIG. 8) indicates that a current operating state of the EPB system 30 (see FIG. 8) is an abnormal state when the determiner 804 (see FIG. 8) determines that an operation availability signal of the EPB system 30 (see FIG. 8) is not input.

As another example, as illustrated in FIG. 10, in second indicating operation S1007, the second indicator 810 (see FIG. 8) indicates that a current operating state of the EPB system 10 (see FIG. 8) is an abnormal state when the determiner 804 (see FIG. 8) determines the second current drive information is not the second reference drive information.

The control apparatus 800 and the control methods 900 and 1000 for the EPB system 30 according to the third embodiment of the present disclosure includes the inputter 802, the determiner 804, controller 806 and the second indicator 810 and perform input operations S902 and S1002, determination operations S904, S1004, and S1006, second indicating operations S905 and S1007, and braking operations 908 and S1008.

Therefore, the control apparatus 800 and the control methods 900 and 1000 for the EPB system 30 according to the third embodiment of the present disclosure allow the EPB system 30 to perform a braking operation when the vehicle stopping control function is abnormally performed in the ESC system 10.

Accordingly, the control apparatus 800 and the control methods 900 and 1000 for the EPB system 30 according to the third embodiment of the present disclosure may stably control vehicle stopping and thus may improve vehicle reliability as well as braking efficiency.

In addition, the control apparatus 800 and the control methods 900 and 1000 for the EPB system 30 according to the third embodiment of the present disclosure may indicate that a current operating state of the EPB system 30 is an abnormal state.

Accordingly, since the control apparatus 800 and the control methods 900 and 1000 for the EPB system 30 according to the third embodiment of the present disclosure may allow a driver to recognize that a current operation state of the EPB system 30 is an abnormal state, time required for maintenance of an EPB system may be reduced to prevent maintenance cost from increasing.

Figure 11:
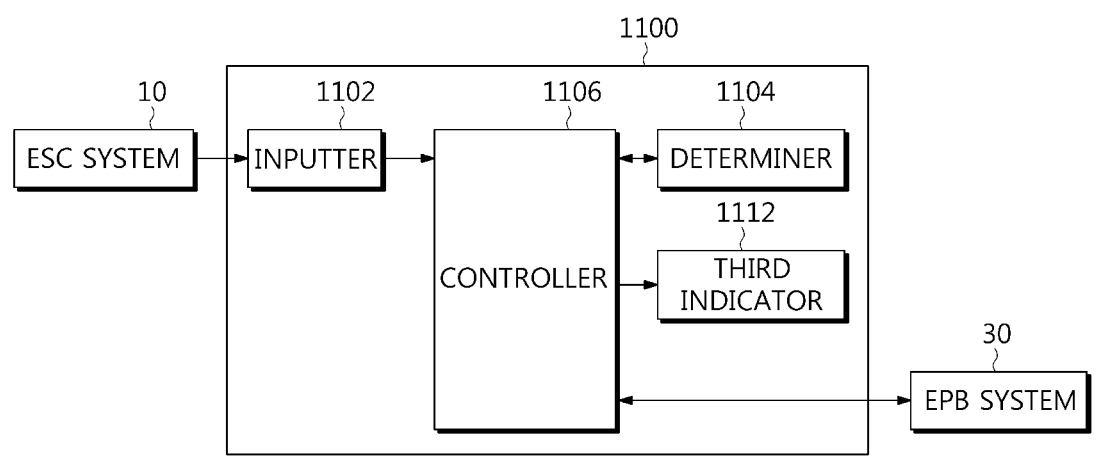
FIG. 11 is a block diagram illustrating an example of a control apparatus for EPB system according to a fourth embodiment of the present disclosure.

FIG. 11 is a block diagram illustrating an example of a control apparatus for EPB system according to a fourth embodiment of the present disclosure.

Referring to FIG. 11, a control apparatus 1100 for an EPB system 30 according to the fourth embodiment of the present disclosure includes an inputter 1102, a determiner 1104, and a controller 1106 which are the same as those in the control apparatus 100 (see FIG. 2) for the EPB system 30 (see FIG. 2) according to the first embodiment.

Since functions of the inputter 1102, the determiner 1104, and the controller 1106, and systematic connection relations therebetween in the control apparatus 1100 for the EPB system 30 according to the fourth embodiment of the present disclosure are the same as the functions of the inputter 102 (see FIG. 2), the determiner 104 (see FIG. 2), and the controller 106 (see FIG. 2), and the systematic connection relations therebetween in the control apparatus 100 (see FIG. 2) for the EPB system 30 (see FIG. 2) according to the first embodiment of the present disclosure, additional descriptions on each of the components will be omitted.

Here, the control apparatus 1100 for the EPB system 30 according to the fourth embodiment of the present disclosure further includes a third indicator 1112.

That is, the third indicator 1112 indicates that a braking operation is currently being performed in the EPB system 30 when the controller 1106 transmits a control command to the EPB system 30.

Here, although not illustrated in the drawings, the third indicator 1112 includes at least one of an alarm (not shown), a speaker (not shown), and a light emitting member (not shown) which are provided for a driver to obtain vehicle information or realize a vehicle state and may indicate that a braking operation is currently being performed in the EPB system 30 by at least one of an alarming operation of the alarm (not shown), a voice operation of the speaker (not shown), and a light emitting operation of the light emitting member (not shown).

In addition, although not illustrated in the drawings, the third indicator 1112 includes at least one of a HMI module (not shown) and a HUD module (not shown) which are installed to interface a user and a machine to allow the driver to understand vehicle information or a vehicle state and may indicate that a braking operation is currently being performed in the EPB system 30 by one of a HMI message display operation of the HMI module and a HUD message display operation of the HUD module.

A control method for controlling the EPB system 30 using the control apparatus 1100 for the EPB system 30 according to the fourth embodiment of the present disclosure will be described with reference to FIGS. 12 to 13 below.

Figure 12:
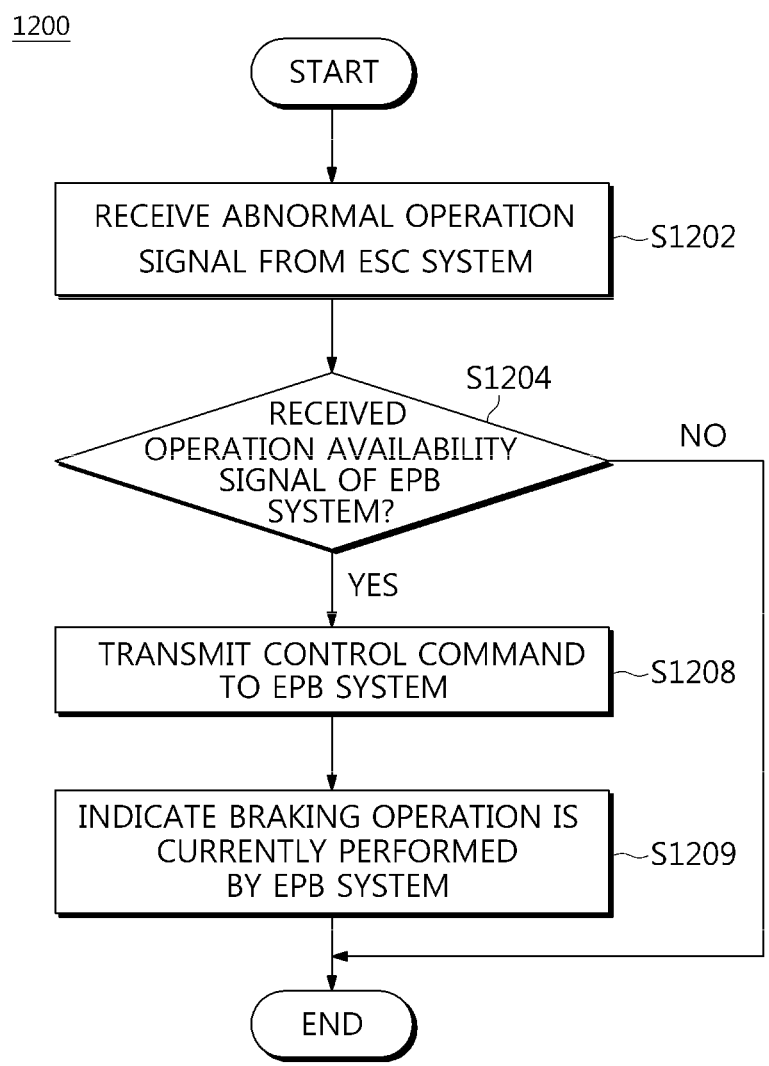
FIG. 12 is a flowchart illustrating an example of the method for controlling the EPB system using the control apparatus for the EPB system according to the fourth embodiment of the present disclosure.
Figure 13:
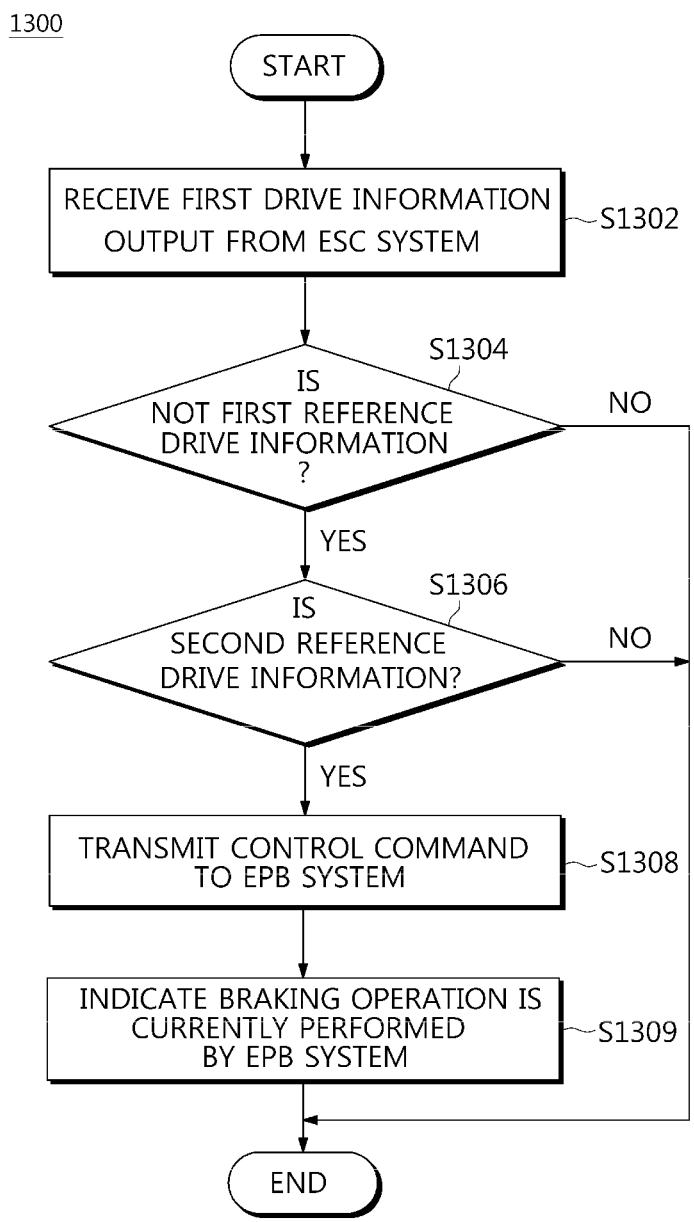
FIG. 13 is a flowchart illustrating another example of the method for controlling the EPB system using the control apparatus for the EPB system according to the third embodiment of the present disclosure.

FIG. 12 is a flowchart illustrating an example of the method for controlling the EPB system using the control apparatus for the EPB system according to the fourth embodiment of the present disclosure, and FIG. 13 is a flowchart illustrating another example of the method for controlling the EPB system using the control apparatus for the EPB system according to the third embodiment of the present disclosure.

Referring to FIGS. 12 and 13, control methods 1200 and 1300 for controlling the EPB system 30 (see FIG. 11) using the control apparatus 1100 (see FIG. 11) for the EPB system 30 (see FIG. 11) according to the fourth embodiment of the present disclosure include input operations S1202 and S1302, determination operations S1204, S1304, and S1306, and braking operations S1208 and S1308 which are the same as those in the control methods S300 (see FIG. 3) and S400 (see FIG. 4) for the EPB system 30 (see FIG. 2) using the control apparatus 100 (see FIG. 2) for the EPB system 30 (see FIG. 2) according to the first embodiment.

Since functions of input operations S1202 and S1302, determination operations S1204, S1304, and S1306, and braking operations S1208 and S1308, and systematic connection relations therebetween in the control methods 1200 and S1300 for the EPB system 30 (see FIG. 11) according to the fourth embodiment of the present disclosure are the same as the functions of input operations S302 (see FIG. 3) and S402 (see FIG. 4), determination operations S304 (see FIG. 3) and S404 and S406 (see FIG. 4), and determination operations S304 (see FIG. 3), S404 and S406 (see FIG. 4), and braking operations S308 (see FIG. 3) and S408 (see FIG. 4) and the systematic connection relations therebetween in the control methods 300 (see FIG. 3) and 400 (see FIG. 4) for the EPB system 30 (see FIG. 2) according to the first embodiment of the present disclosure, additional descriptions on each of the components will be omitted.

Here, the control methods 1200 and 1300 for the EPB system 30 (see FIG. 11) according to the fourth embodiment of the present disclosure further include third indicating operations S1209 and S1309.

For example, as illustrated in FIGS. 12 and 13, in third indicating operations S1209 and S1309, the third indicator 1112 (see FIG. 11) indicates that the braking operation is currently being performed by the EPB 30 (see FIG. 11) when the controller 1106 (see FIG. 11) transmits a control command to the EPB system 30 (see FIG. 11).

The control apparatus 1100 and the control methods 1200 and 1300 for the EPB system 30 according to the fourth embodiment of the present disclosure include the inputter 1102, the determiner 1104, the controller 1106 and the third indicator 1112 and perform input operations S1202 and S1302, determination operations S1204, S1304, and S1306, braking operations 1208 and S1308, and third indicating operations S1209 and S1309.

Therefore, the control apparatus 1100 and the control methods 1200 and 1300 for the EPB system 30 according to the fourth embodiment of the present disclosure allow the EPB system 30 to perform the braking operation when the vehicle stopping control function is performed in the ESC system 10 due to an abnormal operation.

Accordingly, the control apparatus 1100 and the control methods 1200 and 1300 for the EPB system 30 according to the fourth embodiment of the present disclosure may stably control vehicle stopping and thus may improve vehicle reliability as well as braking efficiency.

In addition, since the control apparatus 1100 and the control methods 1200 and 1300 for the EPB system 30 according to the fourth embodiment of the present disclosure may indicate that a braking operation is currently being performed by the EPB system 30, a driver may recognize that braking operation is currently being performed by the EPB system 30, and thereby guiding the driver to be careful with vehicle stopping control.

As is apparent from the above description, the control apparatus and the control methods for the EPB system according to the embodiments of the present disclosure may improve vehicle reliability as well as braking efficiency.

In addition, the control apparatus and the control methods for the EPB system according to the embodiments of the present disclosure may guide the driver to be careful with vehicle stopping control.

In addition, the control apparatus and the control methods for the EPB system according to the embodiments of the present disclosure may reduce time required for the maintenance of an EPB system to prevent maintenance cost from increasing.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A control apparatus for an electronic parking brake (EPB) system, comprising:
   an inputter configured to receive an abnormal operation signal from an electronic stability control (ESC) system when the ESC system abnormally performs a vehicle stopping control function;
   a determiner configured to determine whether an operation availability signal of an electronic parking brake (EPB) system is input from the EPB system in response to the abnormal operation signal of the ESC system; and
   a controller configured to:
   activate the EPB system such that the EPB system performs a braking operation when the abnormal operation signal is received from the ESC system and the operation availability signal of the EPB is input from the EPB system; and
   control a first indicator such that the first indicator indicates that a current operation state of the EPB system is an abnormal state when the operation availability signal of the EPB system is not input from the EPB system.

2. The control apparatus of claim 1, wherein the inputter is configured to receive the abnormal operation signal from the ESC system when the ESC system abnormally performs at least one of an AVH (Automatic Vehicle Hold), and an HSA (Hill Start Assist).

3. The control apparatus of claim 1, further comprising a second indicator configured to indicate that a current operation state of the ESC system is an abnormal state when the abnormal operation signal is input.

4. The control apparatus of claim 1, further comprising a third indicator configured to indicate a braking operation is currently being performed by the EPB system, when the control command is transmitted to the EPB system.

5. A control apparatus for an electronic parking brake (EPB) system, comprising:
   an inputter configured to receive a first current drive information output from an electronic stability control (ESC) system when the ESC system performs a vehicle stopping control function;
   a determiner configured to determine whether a second current drive information output from the EPB system is a preset second reference drive information, when the first current drive information of the ESC system is not a preset first reference drive information; and
   a controller configured to activate the EPB system such that the EPB system performs a braking operation, when the first current drive information of the ESC system is not the first reference drive information and the second current drive information of the EPB system is the second reference drive information, wherein the determiner determines whether a current operating voltage value of the ESC system serving as current fault estimation information corresponding to the first current drive information deviates from a reference operating voltage value range of the ESC system serving as reference fault estimation information corresponding to the first reference drive information or whether the current operating voltage value of the ESC system serving as current overheating estimation information corresponding to the first current drive information deviates from the reference operating voltage value range of the ESC system serving as reference overheating estimation information corresponding to the first reference drive information.

6. The control apparatus of claim 5, wherein the inputter is configured to receive the first current drive information output from the ESC system when the ESC system performs at least one of an AVH (Automatic Vehicle Hold), and an HSA (Hill Start Assist).

7. The control apparatus of claim 5, further comprising a first indicator configured to indicate that a current operation state of the ESC system is an abnormal state unless the first current drive information is the first reference drive information.

8. The control apparatus of claim 5, wherein the determiner determines whether a current operating voltage value of the EPB system serving as current operation availability estimation information corresponding to the second current drive information deviates from a reference operating voltage value range of the EPB system serving as reference operation availability estimation information corresponding to the second reference drive information.

9. The control apparatus of claim 5, further comprising a second indicator configured to indicate a current operation state of the EPB system is an abnormal state unless the second current drive information is the second reference drive information.

10. The control apparatus of claim 5, further comprising a third indicator configured to indicate a braking operation is currently being performed by the EPB system, when the control command is transmitted to the EPB system.

11. A control method for an electronic parking brake (EPB) system, comprising:

receiving an abnormal operation signal from an electronic stability control (ESC) system when vehicle stopping control function is abnormally performed in the ESC system;

determining whether an operation availability signal of the EPB system is input from the EPB system when the abnormal operation signal of the ESC system is input from the ESC system;

activating the EPB system such that the EPB system performs a braking operation, when the abnormal operation signal of the ESC system is input from the ESC system and the operation availability signal of the EPB system is input from the EPB system; and indicating that a current operation state of the EPB system is an abnormal state when the operation availability signal of the EPB system is not input from the EPB system.

12. A control method for an electronic parking brake (EPB) system, comprising:

receiving first current drive information output from an electronic stability control (ESC) system when the ESC system performs a vehicle stopping control function;

determining whether second current drive information output from the EPB system is a preset second reference drive information, when first current drive information of the ESC system is a preset first reference drive information; and activating the EPB system such that the EPB system performs a braking operation, when the first current drive information of the ESC system is the preset first reference drive information and the second current drive information of the EPB system is the second reference drive information, wherein the determining whether the second current drive information output from the EPB system is the preset second reference drive information comprises determining whether a current operating voltage value of the ESC system serving as current fault estimation information corresponding to the first current drive information deviates from a reference operating voltage value range of the ESC system serving as reference fault estimation information corresponding to the first reference drive information or whether a current operating voltage value of the ESC system serving as current overheating estimation information corresponding to the first current drive information deviates from the reference operating voltage value range of the ESC system serving as reference overheating estimation information corresponding to the first reference drive information.

* * * * *